United States Patent [19]

Okuma et al.

[11] 3,977,767

[45] Aug. 31, 1976

[54] ELECTRO-OPTICAL CELL

[75] Inventors: Yoshihisa Okuma, Tokyo; Takashi Toida, Chiba; Ichiro Tsunoda, Kawasaki, all of Japan

[73] Assignee: Dai Nippon Insatsu Kabushiki Kaisha, Tokyo, Japan

[22] Filed: July 21, 1975

[21] Appl. No.: 597,487

[30] Foreign Application Priority Data

July 23, 1974 Japan.............................. 49-84346

[52] U.S. Cl............................ 350/160 LC; 252/299; 428/1
[51] Int. Cl.²......................................... G02F 1/13
[58] Field of Search...................... 350/150, 160 LC; 252/299; 428/1

[56] References Cited
UNITED STATES PATENTS 3,864,021  2/1975  Katagiri et al................ 350/160 LC
3,864,905  2/1975  Richardson............. 350/160 LC UX

*Primary Examiner*—Edward S. Bauer
*Attorney, Agent, or Firm*—Spensley, Horn & Lubitz

[57] ABSTRACT

An electro-optical cell comprises, on an optical path: front and back electrode base plates each comprising a transparent base plate having an inner surface, an electrode film provided on said inner surface, and an optically active poly-α-amino acid film provided on said inner surface over the electrode film and orientated in one direction intersecting the orientated direction of the poly-α-amino acid film of the other electrode base plate, the electrode base plates being disposed with the inner surfaces of their base plates in mutually facing state; and a nematic liquid crystal substance having a positive dielectric anisotropy and interposed between the front and back electrode base plates. Electro-optical devices can be fabricated by combining this electro-optical cell with front and back polarizers with polarization directions at specific angles relative to the orientation processed directions of the electrode base plates and by further adding a reflecting plate.

14 Claims, 11 Drawing Figures

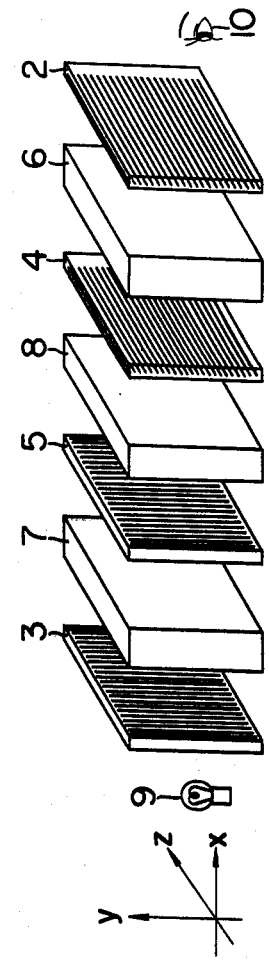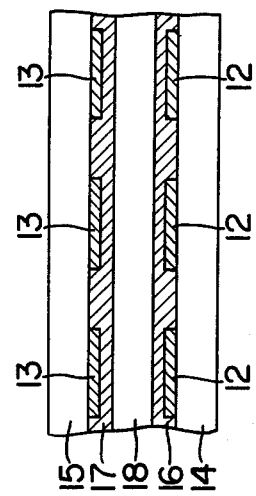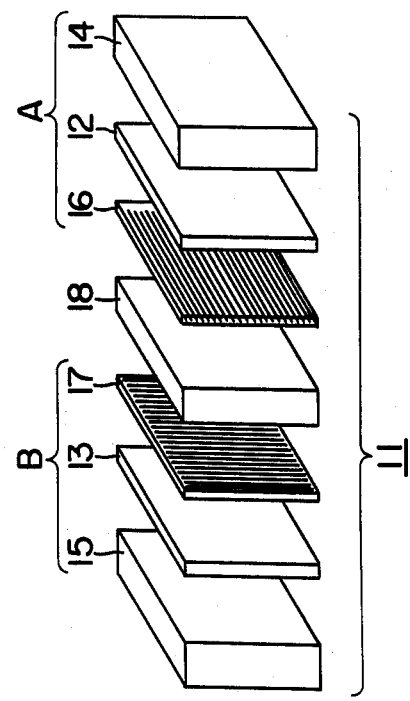

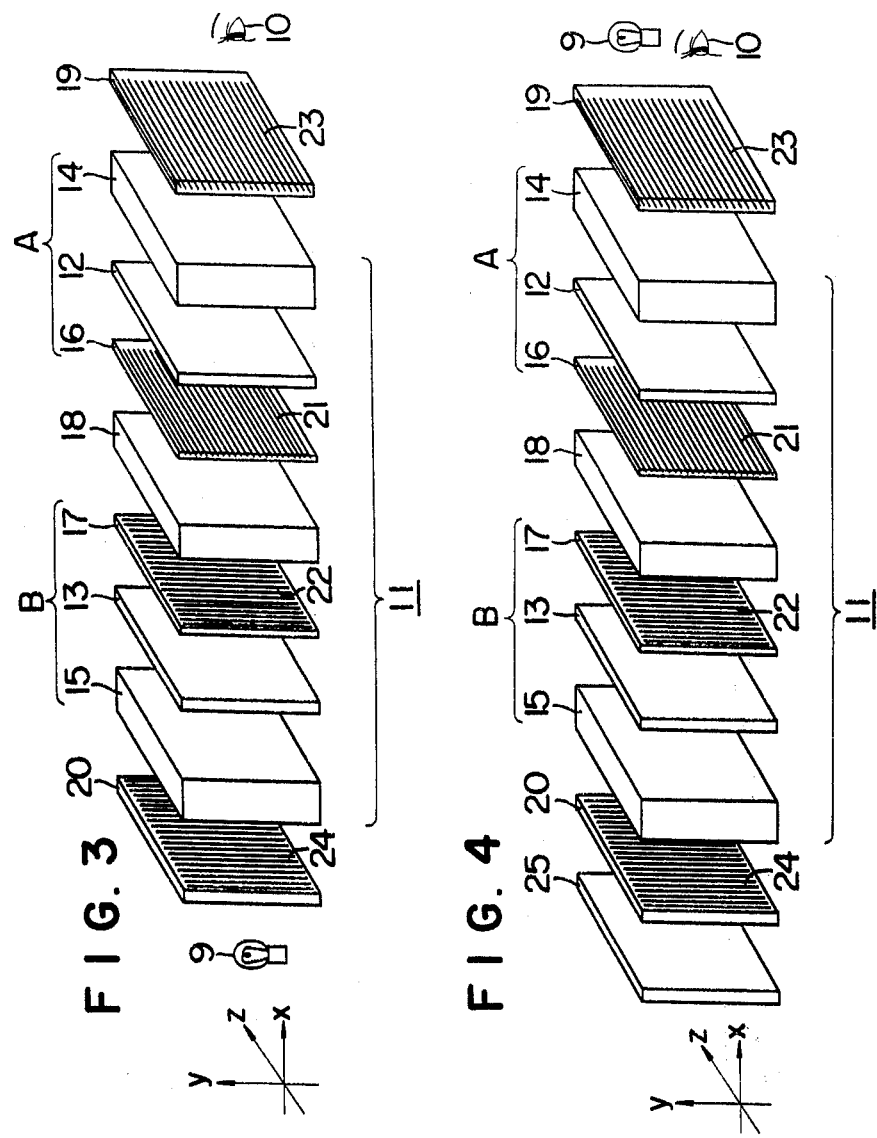

ELECTRO-OPTICAL CELL

BACKGROUND OF THE INVENTION

This invention relates generally to an electro-optical cell for liquid crystal display of (electric) field effect type of improved characteristics such as visibility angle, contrast, and response.

There are two principal types of apparatus used as display apparatus for converting electrical signals into visible information by utilizing the optical anisotropy of a liquid crystal. In one of these, a dynamic scattering (DS) phenomenon wherein a nematic liquid crystal having negative dielectric anisotropy scatters light upon the application of an electric field is utilized for display (as disclosed, for example, in British Patent No. 1,167,486). In the other apparatus, a nematic liquid crystal having positive dielectric anisotropy is interposed and clamped between a pair of electrode base plates whose surfaces have been orientated thereby to impart optical rotation to the liquid crystal, and the optical rotation of the liquid crystal is caused to vary by the application of a suitable electric field and thus utilized for displaying (as disclosed, for example, in Japanese Patent Laid Open No. 11737/1972).

The latter apparatus of field effect (FE) type has such features as lower-voltage operation, lower power consumption, and longer life compared with the DS type of the former, and, for this reason, has wide utility in applications such as various displays and optical shades. A representative display apparatus of FE type has a construction, for example, as shown in exploded view in FIG. 1. The FE type electro-optical apparatus illustrated in FIG. 1 has an electro-optical cell 1 and a pair of polarizers 2 and 3 all disposed and aligned on a single optical axis.

The electro-optical cell 1 comprises a pair of glass plates 6 and 7, transparent electrodes 4 and 5 disposed on the inner sides of the glass plates 6 and 7, respectively, and a liquid crystal substance 8 having positive dielectric anisotropy and sandwiched between the electrodes 4 and 5. The electrode 4 has an inner surface which is orientation processed in the direction of the Z axis, for example as indicated, while the electrode 5 has an inner surface which is orientation processed in the Y-axis direction orthogonal to the Z axis.

When an electric field is not impressed between the electrodes 4 and 5, the longitudinal axes of the molecules of the liquid crystal substance 8 are aligned in the Z direction at the interface where the liquid crystal substance 8 contacts the electrode 4 and in the Y direction at the interface where the liquid crystal substance 8 contacts the electrode 5. Accordingly, the molecules of the liquid crystal substance 8 are arranged in a helical state wherein they are uniformly twisted through 90° of angle between the electrodes 4 and 5.

Then, when the polarization directions of the polarizers 2 and 3 are respectively aligned in the Z and Y directions, and no electric field is applied between the electrodes 4 and 5, the light from a light source 9 passes through the polarizer 3 and the electro-optical cell 1, and is twisted to change its vibration plane by 90° of angle while passing through the electro-optical cell 1, so that the light passes through the polarizer 3 to reach an observer 10.

When an electric field is impressed between the electrodes 4 and 5, the molecules of the liquid crystal substance 8 are so aligned that their dipoles are all directed toward the electric field. Since the molecular alignment of the liquid crystal substance 8 is thereby disarranged, the light from the light source 9, although passing through the polarizer 3 and the electro-optical cell 1, is shielded off by the polarizer 2. As a result, as viewed from the side of the observer 10, only a light of dark blue color resembling light transmitted through only the pair of polarizers 2 and 3 constituting mutually perpendicular nicol prisms is transmitted and is visible.

In an FE type electro-optical device of this transmission type, the electro-optical cell controls the vibration direction of the transmitted light depending on the presence or absence of an electric field and has the functional capability of causing or not causing the vibration plane of light passing through the polarizer on one side to coincide with the polarization direction of the polarizer disposed on the other side. In other words, a pair of polarizers is a valve which selects the vibration direction of light transmitted therethrough, while an electro-optical cell is a valve which controls the rotation of the vibration direction of transmitted light In an FE type electro-optical device, as described above, the operational principle comprises controlling or realigning the initial orientation of the liquid crystal by means of an electric field and utilizing a change in the optical properties of the liquid crystal at this time. For this reason, the uniformity of the initial alignment (that is, the uniformity of the alignment at the time no electric field is applied) is especially important. As a measure for attaining uniformity of the initial alignment of a liquid crystal, the method of rubbing the electrode base plates in one direction each with a material such as cloth has heretofore been known. By this method, however, the alignment of the liquid crystal molecules differ from part to part, whereby the uniformity of the alignment is not adequate. Another problem is that the orientation is lost and the molecular alignment is destroyed in a short time.

Accordingly, as a measure to solve these problems, a method wherein a certain kind of surface-active agent is additionally used in addition to the rubbing of the electrode base plates in one direction (as disclosed, for example, in IBM Technical Disclosure Bulletin, Vol. 13, No. 11, Apr. 1971) is being used. However, while the uniformity of the alignment is improved to some extent by this method, the surface-active agent has inferior heat resistance, and, moreover, the surface-active agent is accompanied by the problem of its causing a deterioration of the liquid crystal. A further difficulty is that, as the application of the electric field is continued, the surface-active agent decomposes because of the electric field and undergoes degeneration, and the orientation is destroyed.

Furthermore, by the above described method wherein the electrode base plates in unprocessed state is rubbed in one direction, or that wherein a certain kind of surface-active agent is additionally used and rubbing is carried out in one direction, in the case where the major axes of the liquid crystal molecules near the electrode surfaces are respectively aligned parallelly to the electrode surfaces and are so orientated that the direction of these axes in one of the pair of electrodes is twisted by 90° relative to those in the other electrode, the rotational direction of the liquid crystal molecules is not uniform, and left and right rotations exist in mixed state. Thus, there arises the problem of differences in the visibility angle, contrast, and response respectively in these two kinds of parts.

Accordingly, we have carried out research with the object of providing an electro-optical cell for FE type liquid crystal display having excellent display performance and not being accompanied by the above described problems when used in electronic desk-top calculators, various timepieces counter display panels, and the like. As a result, we have discovered that this object can be achieved by providing a poly-α-amino acid film, which has been orientation processed, on the surfaces containing electrodes of one pair of electrode base plates constituting parts of an electro-optical cell for FE type liquid crystal display. This invention has been developed on the basis of this discovery.

Throughout this disclosure, the term "poly-α-amino acid(s)" is intended to include condensation polymers of α-amino acids and their ester derivatives.

SUMMARY OF THE INVENTION

According to this invention, briefly summarized, there is provided an electro-optical cell characterized by a laminated structure comprising: two transparent base plates disposed on opposite outer sides of the structure; two electrode films provided on the inner surfaces of the base plates; an optically active poly-α-amino acid film which has been orientated in one direction, and which is provided on the inner surface having the electrode film of each base plate, each base plate and its electrode film and poly-α-amino acid film constituting an electrode base plate, the two electrode base plates being in mutually opposed state with mutually intersecting orientated directions; and a nematic liquid crystal substance having a positive dielectric anisotropy and interposed between the two electrode base plates.

The most important feature of the electro-optical cell of the above described structure according to this invention lies in the orientated optically active poly-α-amino acid film provided on each of the electrode base plates. Because of this provision of the poly-α-amino acid film, the electro-optical cell of this invention has far superior visibility angle, uniformity of contrast, and response to those possessed by a cell having electrode plates which have been subjected to a mere orientation process.

While the reason for this remarkable effect due to the provision of the poly-α-amino acid film is not fully clear, it may be attributed at least partly to a uniformizing of the initial alignment of the liquid crystal substance contacting this film and to a mutual effect between the film and the liquid crystal substance in the neighborhood of the film at the time when an electric field is applied between the electrode base plates as described in detail hereinafter.

This provision of the poly-α-amino acid film in the electro-optical cell of this invention not only affords the above mentioned excellent visibility angle, contrast, uniformity of contrast, and response as a direct effect (effect of uniformizing of the initial alignment) but also enables an electro-optical device formed by the combination of the cell with components such as polarizing plates with due consideration of the polarizing directions of the polarizers to exhibit maximum effectiveness.

The nature, utility, and further features of this invention will be apparent from the following detailed description with respect to a preferred embodiment of the invention when read in conjunction with the accompanying drawings.

BRIEF DESCRIPTION OF THE DRAWINGS

In the drawings:

FIG. 1 is a simplified exploded, perspective view showing the essential organization of an example of an electro-optical device of transmission type in which is used an electro-optical cell for FE type liquid crystal display of the prior art;

FIG. 2a is a similar perspective view showing the essential organization of one example of an electro-optical cell according to this invention;

FIG. 2b is a fragmentary sectional view showing the actual, closely adhering and laminated construction of the electro-optical cell shown in FIG. 2a;

FIG. 3 is a perspective view similar to FIGS. 1 and 2a showing the essential organization of one example of an electro-optical device of transmission type in which an electro-optical cell of this invention is used;

FIG. 4 is a similar perspective view showing the general organization of one example of an electro-optical device of reflection type in which an electro-optical cell of this invention is used;

DETAILED DESCRIPTION

Figure 5:
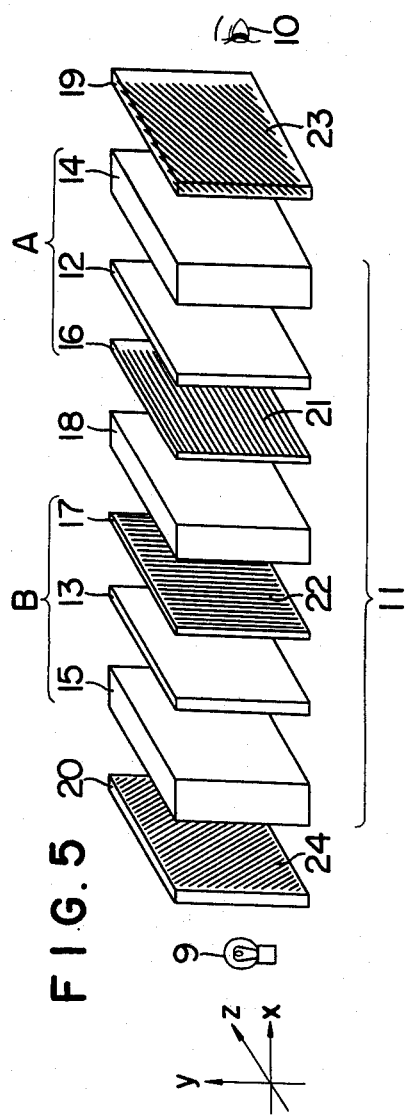
FIG. 5 is a similar perspective view showing one example of a preferred form of an electro-optical device of transmission type according to this invention.

As shown in FIG. 2a, the electro-optical cell 11 of the invention has a structural arrangement in which there are provided a front electrode base plate A and a back electrode base plate B respectively comprising transparent base plates 14 and 15, electrode films 12 and 13 respectively disposed on the inner sides of the base plates 14 and 15, and orientated optically active poly-α-amino acid films 16 and 17 disposed on the inner sides of the electrode films 12 and 13 and being in mutual opposition with their respective orientation processing directions 21 and 22 in mutually intersecting relation, and a nematic liquid crystal substance 18 having a positive dielectric anisotropy is sandwiched between the front and back electrode base plates A and B.

At least one conductor wire (not shown) is connected to each of the electrode films 12 and 13 for applying voltage thereon. It will be readily understood that the actual construction of the electro-optical cell illustrated in exploded view in FIG. 2a, is in closely laminated state as indicated in FIG. 2b.

In the cell of the above described general construction, it is necessary that the pair of base plates 14 and 15 have electrically insulative property and, at the same time, be transparent. For these base plates 14 and 15, a material such as glass, a synthetic resin, or the like is used. On the inner surface of each of these base plates 14 and 15, a transparent electrode film (12 or 13) is formed by an ordinary process. For example, such a transparent electrode film as that consisting principally of tin oxide, indium oxide, or the like can be formed by a process such as the spraying process or the vacuum evaporation deposition process. Each of these electrode films 12 and 13 thus formed is worked after being treated by a measure such as photo-etching to inscribe thereon a specific pattern such as, for example, one or more numerals or characters or a pictorial pattern. In these patterns, of course, the electrode film can be left remaining in a part thereof or the periphery thereof.

Next, for forming the orientated poly-α-amino acid film on each of the inner surfaces of the base plates 14 and 15 bearing the electrode films 12 and 13, any of various methods can be used. For example, one such method comprises preparing a poly-α-amino acid solution of a concentration of from 0.01 to 30 percent by dissolving a poly-α-amino acid in a suitable solvent, applying this solution as a coating on the base plate, drying the coating into a film, and rubbing the film surface in one constant direction by means of an object such as a piece of cloth or a brush.

Another method which can be used, in the case where the poly-α-amino acid is a polymer of a γ-ester derivative of glutamic acid, comprises applying the solution on the electrode base plates and thereafter drying the coated solution while an electric field of from 100 to 10,000 V/cm being applied thereto to form a film. Alternatively, the solution is coated on the electrode base plates and thereafter drying is carried out while applying a magnetic field of from 100 to a number of tens of thousands of oersteds to form a film. A further possible method comprises sticking previously formed films of a poly-α-amino acid to the electrode base plates.

The thickness of this poly-α-amino acid film according to this invention is of the order from 0.01 to 100 microns, preferably from 0.05 to 10 microns. We have found that when this thickness is less than 0.01 micron, the orientation power is weak, and thereby the contrast is poor. On the other hand, when this thickness exceeds 100 microns, it is difficult to apply the solution as a uniform coating, and such a thickness is not desirable since the response deteriorates electrically.

The orientation processing can be carried out in any direction with respect to the electrode pattern of each of the electrode base plates in accordance with factors such as the visibility angle and is not limited to a direction parallel to the edge of the electrode base plate as indicated in FIG. 2a.

For the above mentioned optically active poly-α-amino acids, one which is represented by the general formula

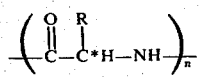

or a condensation polymer of proline or the like can be used. In the above general formula: $n$ is from 10 to $10^4$; R is —CH₃ (alanine),

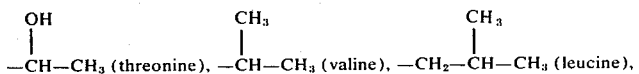

—CH₂OH (serine), —CH₂—CH₂—S—CH₃ (methionine),

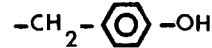

(tyrosine),

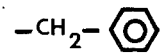

(phenylalanine),

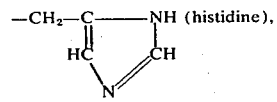

—CH₂—COOH (aspartic acid), —CH₂CH₂COOH (glutamic acid),

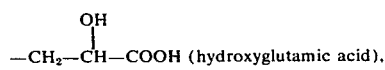

—CH₂CH₂COOR' (glutamate) (where R' is alkyl, alkyl-phenyl, phenyl, or naphthyl), —CH₂CH₂CH₂CH₂NH₂ (lysine), or

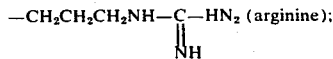

and C* represents an asymmetric carbon atom, there being, respectively, L isomers and D isomers. Here, since a basic poly-α-amino acid lowers the NI point (nematic isotropic transition temperature) of a liquid crystal in some cases, acidic poly-α-amino acids or neutral poly-α-amino acids are desirable.

Among these, the polymers of alanine, leucine, glutamic acid, ester derivatives of glutamic acid, and the like are mostly in an α-helix polymer form to assume a high polymerization degree and, therefore, are preferable. Furthermore, polymers of ester derivatives of glutamic acid are particularly preferable because of their excellent solubilities.

In the preparation of a poly-α-amino acid solution by dissolving a poly-α-amino acid as described above in a suitable solvent, a solvent which is capable of dissolving the poly-α-amino acid and forming a poly-α-amino acid film after removal of the solvent is used, this solvent being different depending on the kind of the poly-α-amino acid. Examples of the solvents which are suitable for use, are dimethylformamide, dimethylacetamide, dimethylsulfoxide, hexamethylphosphoamide, γ- butyrolactone, m-cresol, a hydrocarbon halogenide such as chloroform and dichloroethane, and dioxane.

In the application of a solution as described above as a coating on the electrode base plates, an ordinary coating method such as immersion (dipping), spraying, and rotary coating can be used.

In the above described manner, the pair of electrode base plates provided with orientated poly-α-amino acid films are so disposed that their respective poly-α-amino acid films are on their inner sides, and that they face each other with their orientated directions in mutually intersecting state. For example, the electrode base plates are maintained apart by a constant distance by means such as a spacer interposed therebetween, and the periphery is bonded and fixed by a sealing material comprising a spacer and/or an adhesive.

Examples of materials suitable for use as the above mentioned sealing material are organic materials such as polyester resins, epoxy resins, polyamide resins, acrylic resins, polyimide resins, polyethylene, fluororesins, vinyl chloride resins, vinyl chloride-vinyl acetate copolymers, α-polyolefin resins, polyethylene waxes, microcrystalline waxes, and like single polymers, copolymers, and mixtures thereof and inorganic materials such as low-melting-point glasses. In addition, if an electrical insulative layer is interposed, materials such as indium and various solder materials can be use.

By dispersing beforehand in this sealing material, in a quantity of from 30 to 400 percent by weight relative to the sealing material, a drying agent such as silica gel, magnesia, activated alumina, or anhydrous copper sulfate, infiltration of moisture into the interior of the electro-optical cell can be prevented, and the liquid crystal substance thus sealed can exhibit its desirable characteristics over a long time.

For installing the sealing material, a method such as that wherein a sealing material of frame skeleton film is installed or that wherein an ink composition containing the above mentioned material as its principal ingredient is printed by a method such as the silk-screen printing method can be used.

In sealing the pair of electrodes comprising the front electrode base plate A and the back electrode base plate B, the surface of the sealing part of front electrode base plate and/or the sealing part of the back electrode plate in entirety or partially is roughened beforehand. By this preparatory measure, it is possible to improve the adhesiveness and tightly sealing property of the opposedly facing base plates and to increase the durability of the electro-optical cell. The sealing parts of the base plates can be thus roughened by a method such as a mechanical roughening method such as sand blasting, sand papering, and the use of an embossed roll or paper or by a chemical surface roughening method such as the use of hydrofluoric acid.

After the pair of electrode base plates have been caused to adhere and be fixed by way of the above mentioned sealing material by a measure such as heat pressure bonding of the pair of electrode plates, a nematic liquid crystal substance having a positive dielectric anisotropy is poured through a pouring port provided beforehand, for example, in one part of a base plate or a sealing part. Then the pouring port is sealed by using a material such as a low melting point metal or a material selected from those enumerated above as sealing materials, whereupon the electro-optical cell of this invention is obtained. Alternatively, the liquid crystal substance is caused to drip onto one electrode base plate and is sandwiched between that electrode base plate and the other electrode base plate with a spacer interposed therebetween, and then the resulting laminate structure is sealed.

The above mentioned liquid crystal substance may be a single substance or a composition. A single substance or a composition which, as a whole, has a positive dielectric anisotropy (that is, a characteristic wherein the dielectric constant along the direction of the major axis of the molecules is greater than the dielectric constant in the direction perpendicular to the direction of the major axis of the molecules) is used. For this nematic liquid crystal substance, a single nematic liquid crystal substance comprising one member of nematic liquid crystal materials having a positive dielectric anisotropy (referred to as Np liquid crystal materials) or a composition comprising at least one member of Np liquid crystal materials and at least one of nematic liquid crystal materials having a negative dielectric anisotropy (referred to as Nn liquid crystal materials) and, as a whole, exhibiting a positive dielectric anisotropy is used. In this connection, a liquid crystal substance of a composition comprising two or more constituents gives a wide range of operational temperature of the display element, and is therefore desirable.

Examples of Np liquid crystal materials suitable for use as set forth above, are for example, as follows: anils: p-alkoxybenzylidene-p-cyanoaniline represented by the general formula

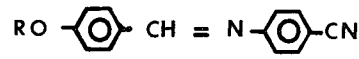

(R: $n$ — $CmH_{2m+1}$, $m = 1$ to 8); p-alkylcarboxybenzylidene-p'-cyanoaniline represented by the general formula

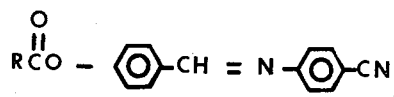

(R: $n$-$CmH_{2m+1}$, $m = 1$ to 6); p-alkylbenzylidene-p'-cyanoaniline represented by the general formula

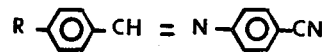

(R: $n$ — $CmH_{2m+1}$, $m = 3$ to 6); p-cyanobenzylidene-p'-alkoxy-aniline represented by the general formula

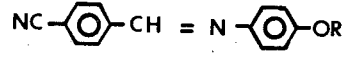

(R: N-$CmH_{2m+1}$, $m = 1$ to 8); p-cyanobenzylidene-p'-alkylaniline represented by the general formula

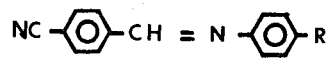

(R: n — $C_mH_{2m+1}$, m = 3 to 6); and p-alkoxybenzylidene-p'-alkylaniline represented by the general formula

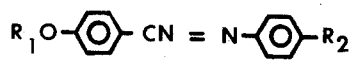

($R_1$: $C_mH_{2m+1}$, m = 1 to 6, $R_2$: $C_{m'}H_{2m'+1}$, m' = 3 to 7);
biphenyls:
p-alkyl- or p-alkoxy-p'-cyanobiphenyl represented by the general formula

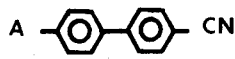

(A: $C_mH_{2m+1}$, $OC_mH_{2m+1}$, m = 5 to 9);
azoxybenzenes:
p-alkyl-p'-alkylazoxybenzene represented by the general formula

($R_1$, $R_2$: n-$C_mH_{2m+1}$, m = 4 to 7);
benzoates:
p-cyanopheyl-p'-n-alkylbenzoate represented by the general formula

(R: $C_mH_{2m+1}$, m = 3 to 8);
p-cyanophenyl-p'-alkoxybenzoate represented by the general formula

(R: $C_mH_{2m+1}$, m = 4 to 7);
p-alkoxyphenyl-p'-cyanobenzoate represented by the general formula

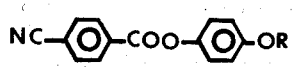

(R: $C_mH_{2m+1}$, m = 4 to 7); and
p-alkylphenyl-p'-cyanobenzoate represented by the general formula

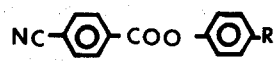

(R: $C_mH_{2m+1}$, m = 4 to 8); and
azo-compounds:
p-cyano-p'-alkoxyazobenzene represented by the general formula

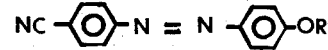

(R: $C_mH_{2m+1}$, m = 4 to 7).

Examples of Nn liquid crystal materials are p-methoxybenzylidene-p'-n-butylaniline and p-ethoxybenzylidene-p'-n-butylaniline. These materials are used as a liquid crystal composition having a positive dielectric anisotropy as a whole by adding thereto at least one Np liquid crystal material which exhibits a great positive dielectric anisotropy.

The uniformity of the initial alignment of this nematic liquid crystal substance having a positive dielectric anisotropy can be further improved by adding thereto an optically active compound such as a cholesteryl compound, or a biphenyl derivative, phenylbenzoate derivative, benzylideneaniline derivative, or azoxybenzene derivative having an optically active substituent in a quantity of from 0.01 to 5 percent by weight with respect to the nematic liquid crystal substance. Of these additives, an additive having a characteristic wherein the helical rotational direction of the liquid crystal which it induces coincides with the helical rotational direction of the liquid crystal which is induced by the poly-α-amino acid constituting the electrode base plates is used.

The poly-α-amino acid film provided on the electrode base plates in the electro-optical cell of this invention, as a result of its optical characteristic, helically induces in only one direction the nematic liquid crystal having a positive dielectric anisotropy in the cell. For example, the L isomer of a poly-γ-glutamate induces the liquid crystal in counterclockwise rotation as viewed from the front electrode base plate side, while the D isomer of the poly-γ-glutamate induces the liquid crystal in clockwise rotation. In this manner, uniformity of the initial alignment of the liquid crystal is attained by the action of the poly-α-amino acid. This uniformity of initial alignment is not lost even by repetition of application of an electric field, and is sustained over a very long time.

As a result of the orientated directions of the pair of electrode plates being caused to intersect, the liquid crystal in the cell assumes a helical structure, and, as described above, the direction of its helical rotation is regulated in one direction by the poly-α-amino acid. Furthermore, while the orientated directions of the pair of electrode base plates may be any direction other than parallel directions, it is preferably 90° of angle from various viewpoints such as visibility angle, contrast, response, etc.

The above described electro-optical cell can be used as one part of a transmission type electro-optical device of (as illustrated in FIG. 3) wherein the cell proper is interposed between a pair of polarizers (a front polarizer close to the front base plate and a back polarizer close to the back base plate) or as a part of reflection type electrical optical device (as illustrated in FIG. 4) wherein a reflecting plate is disposed on the outer side of the back polarizer of the transmission type cell.

While the polarizers and the optical cell or the polarizers and the reflecting plate can, of course, be disposed in respectively spaced apart state, they are ordinarily used in closely contacting state.

The electro-optical device of transmission type, as shown in FIG. 3, comprises essentially an electro-optical cell 11 and a pair of polarizers 19 and 20 respectively disposed on opposite sides of the cell 11, all being disposed coaxially on a single optical axis. The electro-optical cell 11 comprises a pair of electrode base plates A and B respectively having transparent base plates 14 and 15 provided on their inner surfaces with electrode films 12 and 13 and with orientated poly-α-amino acid films 16 and 17 on their surfaces containing the electrode films 12 and 13. That is, the front electrode base plate A and the back electrode base plate B are so disposed in mutually opposed state with their poly-α-amino films 16 and 17 so disposed on their inner sides that the aforementioned orientated directions 21 and 22 are mutually intersecting, and between these electrode base plates A and B, a nematic liquid crystal substance 18 having a positive dielectric anisotropy is interposed.

The electro-optical device of reflection type, as shown in FIG. 4, comprises a device of the transmission type as described above and a reflecting plate 25 disposed coaxially on the same optical axis as and on the outer side of the back polarizer 20 of the transmission type device.

In the above described devices, the polarization directions of the pair of polarizers can be made parallel or substantially parallel respectively to the orientated directions of the respectively adjacent electrode base plates as indicated in FIGS. 3 and 4. Alternatively, the polarization direction can be made parallel on one side and made perpendicularly intersecting on the other side. In this case, transmission of light is attained with respect to the patterned electrode part on the electrode base plates at the time an electric field is applied to the cell.

Figure 6:
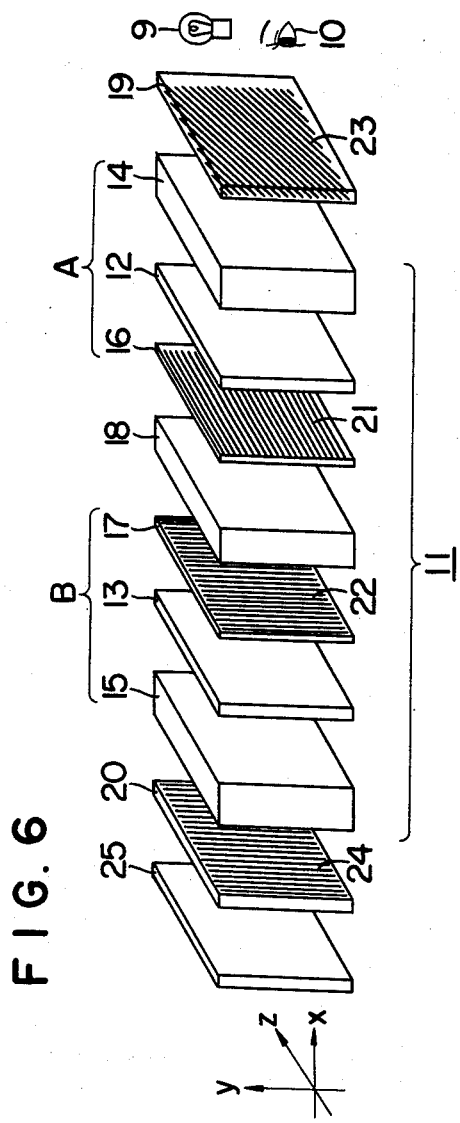
FIG. 6 is a similar perspective view showing one example of a preferred form of an electro-optical device of reflection type according to this invention.

In the transmission type device, the polarization directions of the pair of polarizers can be inclined from 5° to 40° of angle relative to the orientated directions of the respectively adjacent electrode base plates as indicated in FIG. 5. In the reflection type device, the polarization direction of the back polarizer can be made parallel or substantially prallel to the orientated direction of the back electrode base plate, while the polarization direction of the front polarizer can be inclined from 5° to 40° of angle relative to the orientated direction of the front electrode base plate as indicated in FIG. 6.

The visibility angle, contrast, response speed, etc., of the electro-optical cell of this invention is improved even when the polarization direction of a polarizer is made parallel or substantially parallel to the orientated direction of an electrode base plate, but particularly in the case where the polarization direction of a polarizer is inclined relative to the orientated direction of an electrode base plate as described above, the above mentioned characteristics are remarkably improved.

The modes of use of two preferred types of the electro-optical cell of this invention will now be described in some detail. To begin with, the first electro-optical device of the transmission type has an electro-optical cell 11 having a front electrode base plate A and a back electrode base plate B and a pair of polarizers 19 and 20 disposed respectively adjacent to and on the outer sides of these electrode base plates A and B on the same optical axis as shown in FIG. 5. The front electrode base plate A is orientated in the Z-axis direction, while the other back electrode base plate B is orientated in the Y-axis direction orthogonal to the Z-axis direction.

The polarization direction 23 of the front polarizer 19 adjacent to the front electrode base plate A which has been orientated in the Z-axis direction is inclined by an angle of from 5° to 40° in the clockwise or counterclockwise direction relative to the Z axis in the YZ plane. Similarly, the polarization direction 24 of the back polarizer 20 adjacent to the back electrode base plate B which has been orientated in the Y-axis direction is inclined by an angle of from 5° to 40° in the clockwise or counterclockwise direction relative to the Y axis in the YZ plane.

Here, an inclination angle of from 10° to 20° is preferable, and that in the neighborhood of 15° is particularly desirable. We have found, furthermore, that if the inclination of the polarization direction of at least one of the polarizers is less than 5° relative to the orientated direction of the adjacent electrode base plate, a marked effect in comparison with that in the case where the orientated direction and the polarization direction are made parallel will not be recognizable. On the other hand, an inclination angle greater than 40° is not desirable since it results in the generation of interference colors from red to green caused by a slight ununiformity of the gap between the front and back electrode base plates A and B at the time when no electric field is being applied. We have found further that it is preferable that the magnitudes of the angles formed between the above mentioned polarization directions and the orientated directions be the same or substantially the same on the two sides.

The second preferable mode of use of the electro-optical cell of this invention is that in an electro-optical device of reflection type as illustrated in FIG. 6. This device comprises an electro-optical cell 11 having front and back electrode base plates A and B, a pair of polarizers 19 and 20 disposed adjacent to and on the outer sides of the electrode base plates A and B, and, in addition, a reflecting plate 25 disposed on the outer side of the back polarizer 20 opposite from the side of the back electrode base plate B.

As indicated in FIG. 6, the front electrode base plate A is orientated in the Z-axis direction, while the other back electrode base plate B is orientated in the Y-axis direction orthogonal to the Z axis. The polarization direction 23 of the front polarizer 19 adjacent to the front electrode base plate A, which has been thus orientated in the Z-axis direction, is at an angle of from 5° to 40° in the clockwise or counterclockwise direction relative to the Z axis in the YZ plane. On the other hand, the polarization direction 24 of the back polarizer 20 adjacent to the back electrode base plate B, which has been thus orientated in the Y-axis direction, is the same or substantially the same as the Y-axis direction.

The above mentioned reflecting plate 25 is preferably in the form of a thin foil or plate of a metal such as aluminum, gold, copper, or tin with a diffused, irregular reflecting surface. This diffused reflecting surface can be obtained by a method such as sandblasting, etching, heat bonding of glass beads, or evaporation deposition of a material such as SiO. At the time of carrying out this method, the reflecting surface may be colored by means of a material such as a pigment. Alternatively, the diffused, irregular reflecting surface can be obtained by using a metal mirror surface and interposing a sheet of frosted or ground glass between the reflecting surface of a metal mirror and the polarizer 20.

The above mentioned inclination of the polarization direction of the front polarizer 19 is preferably from 10° to 20°, and a value thereof in the neighborhood of 15° is particularly desirable.

We have found that if the angle between the polarization direction 23 of the front polarizer 19 and the orientated direction 21 of the front electrode base plate A is less than 5°, a pronounced effect in comparison with that in the case where these directions are made parallel will not be evident when an electric field is applied. On the other hand, if this angle is greater than 40°, it will give rise to the generation of undesirable interference colors from red to green caused by slight ununiformity of the gap between the front and back electrode base plates A and B at the time when no electric field is being applied. We have found further that a greater deviation of the polarization direction 24 of the back polarizer 20 and the orientated direction 22 of the back electrode base plate B from a parallel state is not desirable since it gives rise to a coloring phenomenon at the time when the electric field is not being applied.

In each of the two types of electro-optical devices of the above described organizations, the visiblity angle, contrast, and the response speed can be greatly improved by not causing coincidence between the orientated direction or directions of both or one of the pair of electrode base plates A and B and the polarization direction or directions of the adjacent polarizer or polarizers. This is a phenomenon which could not be observed in the case where use is made of a conventional electro-optical cell in which poly-α-amino acid films are not provided on the electrode base plates.

This phenomenon may be attributed to a strong interaction between the poly-α-amino acid films and the liquid crystal substance and to the non-coincidence between the orientated direction of a poly-α-amino acid film and the direction of alignment of the molecules of the liquid crystal. More specifically, this phenomenon may be attributed to a combination of an effect wherein, as a result of destruction of the helical structure due to realignment of the molecules of the liquid crystal at the time of application of the electric field, the light reaches the back polarizer 20 without rotating its vibrating plane and of a selective scattering phenomenon due to rotation of the molecular axes of the liquid crystal molecules in the vicinity of the electrode surfaces as a result of a strong interaction between the poly-α-amino films and the liquid crystal moelcules, whereby the contrast and visibility angle are improved.

We have found still further that the effectiveness of each of the two types of electro-optical devices described above can be increased when the manner in which the polarization direction is inclined is controlled with consideration of the direction of helical rotation of the liquid crystal within the cell induced by the poly-α-amino acid. In the case of the transmission type, the effectiveness is excellent when the polarization direction 23 of the front polarizer 19 is inclined in the same direction as the direction of helical rotation of the liquid crystal induced by the poly-α-amino acid used, while the polarization direction 24 of the back polarizer 20 is inclined in the opposite direction. In the case of the reflection type, the effectiveness is excellent when the polarization direction 23 of the front polarizer 19 is inclined in the same direction as the direction of helical rotation of the liquid crystal induced by the poly-α-amino acid used.

Figure 7:
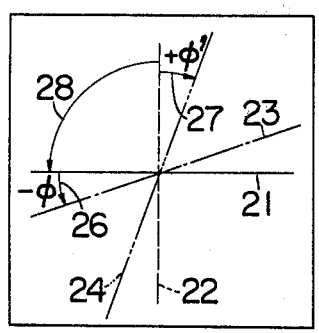
FIGS. 7 and 8 are end views of the electro-optical device illustrated in FIG. 5 as viewed from the observer 10 in the X-axis direction, respectively indicating relationships between the orientated directions of the pair of electrode base plates and polarization directions of the pair of polarizers.

This will now be considered in conjunction with the following diagrams. First, FIGS. 7 and 8 are diagrammatic end views of the electro-optical device in FIG. 5 as viewed from the side of the observer 10 in the X-axis direction, while FIGS. 9 and 10 are similar end views of the electro-optical device in FIG. 6 as viewed from the side of the observer 10 in the X-axis direction, each of these FIGS. 7 through 10 indicates the relationships between the orientated directions 21 and 22 imparted to the pair of electrode base plates A and B and the polarization directions 23 and 24 of the pair of polarizers 19 and 20.

In FIGS. 7 through 10: the full line 21 indicates the orientated direction 21 of the front electrode base plate A; the intermittent line 22 comprising dashes indicates the orientated direction 22 of the back electrode base plate B; the single-dot chain line 23 indicates the polarization direction 23 of he front polarizer 19; while the two-dot chain line 24 indicates the polarization direction 24 of the back polarizer 20.

In addition, reference numeral 26 designates the direction in which the polarization direction 23 of the front polarizer 19 is rotated from the orientated direction 21 of the front electrode base plate A, the angle $\phi$ being the aforementioned inclination or rotational angle of from 5° to 40°. Reference number 27 designates the direction in which the polarization direction 24 of the back polarizer 20 is rotated from the orientated direction 22 of the back electrode base plate B in the transmission type device, the angle $\phi'$ being the aforementioned rotational angle of from 5° to 40°. Here, the angles $\phi$ and $\phi'$ are positive (+) in the clockwise direction as viewed by the observer 10 and negative (−) in the counterclockwise direction. In addition, reference numeral 28 designates the direction of helical rotation of the liquid crystal induced by the poly-α-amino acid.

Figure 8:
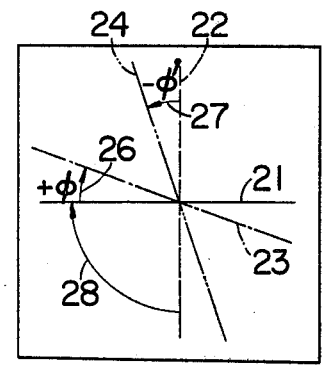
Figure 9:
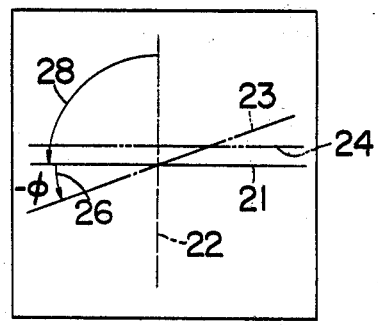
FIGS. 9 and 10 are similar end views of the electro-optical device illustrated in FIG. 6 as viewed from the observer 10 in the X-axis direction, respectively indicating relationships between the orientated directions of the pair of electrode base plates and polarization directions of the pair of polarizers.
Figure 10:
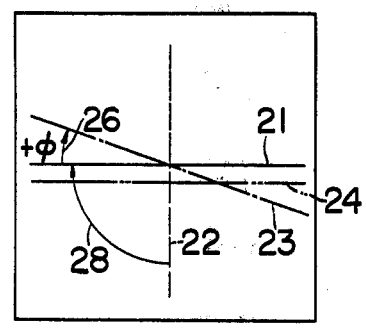

FIGS. 8 and 9 illustrate desirable forms in the case where a substance which induces counterclockwise rotation of the liquid crystal as viewed from the side of the observer 10, as in the case of the L isomer of a poly-γ-glutamate, for example, is used as the poly-α-amino acid. FIGS. 8 and 10 illustrate desirable forms in the case where a substance which induces clockwise rotation of the liquid crystal as viewed from the side of the observer 10 as in the case of the D isomer of a poly-γ-glutamate, for example, is used as the poly-α-amino acid.

As will be apparent from the foregoing description, it is possible, in the electro-optical cell of this invention, to achieve uniformization of the initial alignment of the liquid crystal within the cell because of the effect of the poly-α-amino acid film provided on the electrode base plates. In an electro-optical device in which polarizers and a reflecting plate are combined with this cell, the device can be caused to acquire an extremely good performance in concert with the effect of the poly-α-amino acid by inclining the polarization directions of the polarizers. Furthermore, the above mentioned effect can be enhanced by controlling in accordance with the characteristic of the poly-α-amino acid used the direction in which the polarization directions of the polarizers are caused to vary from the orientated directions of the electrode base plates.

The electro-optical cell of this invention, when used for liquid crystal display of field-effect type, is highly effective in various fields such as electronic desk-top calculators, various timepieces, and counting and displaying panels.

In order to indicate still more fully the nature and utility of this invention, the following specific examples of practice constituting preferred embodiments of the invention in concrete form are set forth, it being understood that these examples are presented as illustrative only and that they are not intended to limit the scope of the invention. Throughout the following disclosure, quantities given in the unit of "parts" are parts by weight. Furthermore, A.C. voltages given in the following examples indicate effective values in all cases.

EXAMPLE 1

Glass plates for electrodes on which tin oxide had been deposited by evaporation were washed and thereafter immersed in and coated with a 1-percent solution of poly-γ-methyl-D-glutamate (solvent system, 1,2-dichloroethane: perchloroethylene = 7 : 3). The glass plates thus coated were thereafter heated and dried. A pair of these glass plates for electrodes were orientated by rubbing each in a single direction with a cloth.

Next, a microcrystalline wax into which 250 parts of activated alumina with respect to 100 parts of resin had been admixed was heated and melted and was printed by the silk-screen method on the seal parts of the above described pair of glass plates constituting electrode base plates A and B, which were then bonded and fixed with their surfaces coated with the poly-α-amino acid film on the inner side and facing each other and with their respective orientated directions mutually perpendicular.

Thereafter, a mixed nematic liquid crystal substance composed of 50 parts of p-methoxybenzylidene-p'-n-butylaniline, 50 parts of p-ethoxybenzylidene-p'-n-butylaniline, 60 parts of p-n-propoxybenzylidene-p'-cyanoaniline, and 5 parts of p-n-amylbenzylidene-p'-cyanoaniline was introduced into the space between the glass plates through a pouring port which had been provided beforehand, and then the pouring port was sealed with an epoxy resin, whereupon an electro-optical cell (*i*) was obtained.

In addition, another mixed liquid crystal substance was prepared by adding 0.02 gram (g.) of (+) p-isoamyloxy-p'-cyanobiphenyl to 10 g. of the above described mixed nematic liquid crystal substance and was used to fabricate an electro-optical cell (*ii*) in the same manner as set forth above.

A pair of polarizers were then arranged on respectively opposite ends of each of the electro-optical cells (*i*) and (*ii*) with angular alignments such that the polarization directions of these polarizers were parallel to the orientated directions of their respectively adjacent electrode base plates. Thus, two electro-optical devices were fabricated.

The above described electro-optical devices comprising the cells (*i*) and (*ii*) were both found to have uniform alignment and excellent contrast, visibility angle, and durability of orientation. Various characteristics of these devices (*i*) and (*ii*) were measured and found to be as follows.

|  |  | (i) | (ii) |
|---|---|---|---|
| Contrast: |  | 1:40 | 1:42 |
| Visibility angle, (deg.): |  | 65 | 65 |
| Transmittance distribution: |  | 83 | 85 |
| (transmittance at 3 points |  | 83 | 83 |
| taken at random in the cell, | (%) | 84 | 85 |
| same with the data appearing hereinafter) |  |  |  |

On the other hand, a cell (*iii*) was fabricated by using glass plates for electrodes which were orientated merely by rubbing without a coating of a poly-α-amino acid. The device comprising this cell (*iii*) was found to have poor contrast and visibility angle, as indicated below, and disorientation occurred as a result of one month of continuous operation at V = 10 V., 32 Hz, sine wave.

|  | (iii) | After 1 month |
|---|---|---|
| Contrast: | 1:25 | — |
| Visibility angle, (deg.): | 40 | — |
| Transmittance distribution (%): | 73 | 34 |
|  | 79 | 37 |
|  | 76 | 54 |

In comparison, no substantial variation in the performance of the electro-optical devices (*i*) and (*ii*) was observable when they were subjected to the same continuous operation.

The above values of transmittance were measured by means of a densitometer, designation PD 402, manufactured by the MacBeth Company, U.S.A. The luminance of the light transmitted through the pair of polarizers of parallel polarization directions was taken as 100 percent. Furthermore, contrast is the ratio of the transmittances with and without application of the electric field. Visibility angle is the angle, when the electro-optical cell is placed on a horizontal platform, between the vertical direction of the cell and the limiting visible direction when voltage is applied.

In the following examples, the measurements were carried out in the same manner except that, in a reflection type device, the transmittance was measured with a MacBeth densitometer of the designation RD 100.

EXAMPLE 2.

Glass plates for electrodes coated with indium oxide evaporation deposited thereon were washed and thereafter immersed in and coated by a 0.5-percent dimethylformamide solution of poly-L-alanine. These plates were then dried by heating in a vacuum. Each of a pair of these glass plates was orientated by rubbing in one direction with a cloth. The pair of plates thus processed were then bonded and fixed with their surfaces coated with the poly-α-amino acid film on the inner side and facing each other and with their respective orientated directions at right angles to each other by interposing between their seal parts a hot-melt type nylon film of 30-micron thickness and heatpressure bonding.

Thereafter, mixed nematic liquid crystal substance composed of 50 parts of p-methoxybenzylidene-p'-n-butylaniline, 50 parts of p-ethoxybenzylidene-p'-n-butylaniline, and 5 parts of p-n-propylbenzylidene-p'-cyanoaniline was introduced into the space between the two plates through a pouring port provided beforehand, and this port was sealed with an epoxy resin. Thus, an electro-optical cell (iv) was fabricated.

In addition, another mixed liquid crystal substance prepared by adding 0.02 g. of (−) cholesterylnonanoate to 10g. of the above described mixed nematic liquid crystal substance was used to fabricate an electro-optical cell (v) in the same manner as set forth above.

A pair of polarizers were then arranged on respectively opposite ends of each of the electro-optical cells (iv) and (v) with angular alignments such that the polarization directions of these polarizers were parallel to the orientated directions of their respectively adjacent electrode base plates. In addition, an aluminum reflecting plate on which SiO had been deposited by evaporation was positioned on the outer side of the back polarizer, that is, the side of the back polarizer opposite from the back electrode base plate. Thus, an electro-optical device was fabricated.

The electrode-optical devices (iv) and (v) fabricated in the above described manner were both found to have uniform alignment and excellent characteristics of a contrast of 1 : 50 and a visibility angle of over 70 degrees at 6 V (32 Hz sine wave). Furthermore, these devices after being heated to 70°C and then cooled to room temperature were found to have retained their uniformity of alignment and their excellent characteristics which they possessed prior to heating.

EXAMPLE 3.

Four electro-optical cells (A), (B), (C), and (D), each identical to the cell (i) of Example 1, were prepared. On the front and back outer ends of each cell, front and back polarizers were respectively positioned with inclinations of $\phi$ and $\phi'$ of their respective polarization directions relative to the orientated directions of the front and back electrode base plates, respectively, the inclinations $\phi$to and $\phi'$ for the four cells being as follows.

|   |        | (A) | (B) | (C) | (D) |
|---|--------|-----|-----|-----|-----|
| $\phi$  | (deg.) | −20 | −20 | +20 | +20 |
| $\phi'$ | (deg.) | −20 | +20 | +20 | −20 |

Thus, four different electro-optical devices were fabricated.

The electro-optical devices (A), (B) and (C) were found to have contrasts of from 1 : 40 to 1 : 45 and visibility angles of from 65° to 70° at 6V (32 Hz, sine wave). The device (D) exhibit excellent characteristics of a contrast of 1 : 70 and a visibility angle of 75°.

EXAMPLE 4.

An electro-optical cell identical to the cell (iv) of Example 2 was prepared, and on the front and back outer ends of this cell, respectively, front and back polarizers were positioned, the polarization direction of the front polarizer being inclined by an angle $\phi$ of +15 degrees relative to the orientated direction of the front electrode base plate and the polarization direction of the back polarizer being parallel to the orientated direction of the back electrode base plate. In addition, on the outer side of the back polarizer, an aluminum reflector plate on which SiO had been deposited by evaporation was positioned, whereupon an electro-optical device (E) was obtained.

Another electro-optical device (F) similar to the device (E) except for an inclination angle $\phi$ of −15° was fabricated in the same manner.

The electro-optical device (E) was found to have a contrast of 1 : 50 and a visibility angle of 72° at 6V (32 Hz, sine wave). The device (F) exhibited excellent characteristics of a contrast of 1 : 80 and visibility angle of 80°.

EXAMPLE 5.

Glass plates for electrodes on which indium oxide had been deposited by evaporation were washed and thereafter immersed in and coated with a 1-percent solution (solvent system, 1,2-dichloroethane: perchloroethylene = 7 : 3) of poly-γ-methyl-L-glutamate. The glass plates thus coated were thereafter heated and dried. A pair of these plates for electrodes were orientated by rubbing each in a single direction with a cloth.

Next, a polyester film of hot-melt type of a thickness of 15 microns was interposed in the seal parts, and the pair of glass plates for electrodes were than bonded and fixed by a heat-pressure method with their respective orientated directions at right angles to each other and with their poly-α-amino acid film surfaces on the inner side and facing each other.

Thereafter, a nematic liquid crystal mixture composed of 40 parts of p-methoxybenzylidene-p'-n-butylaniline, 60 parts of p-ethoxybenzylidene-p'-n-butylaniline, 20 parts of p-n-butoxyphenyl-p'-cyanobenzoate, and 10 parts of p-n-pentoxyphenyl-p'-cyanobenzoate was introduced into the space between the glass plates through a pouring port provided beforehand. This pouring port was then sealed, whereupon an electro-optical cell was obtained.

Then, on the outer side of the front electrode base plate of this electro-optical cell, a front polarizer was so placed that its polarization direction would be rotated from the orientated direction of the front electrode base plate in the same direction as the direction of helical rotation induced in the liquid crystal by the poly-α-amino acid films, that is, through an angle of −15° (= $\phi$). In addition, on the outer side of the back electrode base plate, a back polarizer was so placed that its polarization direction would be rotated from the orientated direction of the back electrode base plate in the direction opposite to the above mentioned helical rotation direction, that is, through an angle of +15° (= $\phi'$). An electro-optical device of transmission type was thus fabricated.

The thus-obtained electro-optical device was found to have a uniform alignment and excellent characteristics of a contrast of 1 : 70 and a visibility angle of 75° degrees at 5 V. Furthermore, when this cell was heated to 80°C and then cooled to room temperature, it was found to have retained its uniformity of orientation and excellent characteristics comparable to those it had possessed prior to heating.

EXAMPLE 6.

The surfaces of all seal parts of a pair of glass base plates were roughened by the hydrofluoric acid method and thereafter indium oxide was deposited by evaporation by an ordinary technique on the base plates thereby to provide electrode films thereon. The resulting glass plates for electrodes were then washed and immersed in and coated with a 1-percent solution (with chloroform as solvent) of poly-γ-benzyl-D-glutamate. -D-glutamate. The plates were then heated and dried.

Each of this pair of plates was orientated by rubbing it in one direction with a cloth.

Next, a thermosetting acryl ink admixed with 200 parts of anhydrous copper sulfate with respect to 100 parts of resin was applied by silk screen printing on the seal parts of the glass plates. The pair of glass plates for electrodes were then placed with their orientated directions at right angles to each other and with their poly-α-amino acid films disposed on their inner sides and facing each other and were then thermally bonded and fixed.

Thereafter, a mixed nematic liquid crystal substance composed of 20 parts of p-methoxybenzylidene-p'-n-butylaniline, 40 parts of p-ethoxybenzylidene-p'-n-butylaniline, 40 parts of n-hexyloxybenzylidene-p'-n-butylaniline, 15 parts of p-n-butoxyphenyl-p'-cyanobenzoate, 15 parts of p-n-heptyloxyphenyl-p'-cyanobenzoate, and 1 part of cholesteryl acetate was introduced into the space between the two plates through a previously provided pouring port, which was then sealed. Thus, an electro-optical cell was completed.

Next, on the outer side of the front electrode base plate of this electro-optical cell, a front polarizer was positioned so that its polarization direction was rotated from the orientated direction of the front electrode base plate in the same direction as the direction of helical rotation induced by the above mentioned poly-α-amino acid films, that is, so that it formed an angle of +20° (= $\phi$) with the orientated direction. Furthermore, on the outer side of the back electrode base plate of this electro-optical cell, a back polarizer was positioned so that its polarization direction was parallel to the orientated direction of the back electrode base plate. In addition, a reflecting plate comprising a matted copper plate was installed on the outer side of the back polarizer, that is, on the side thereof opposite from the back electrode base plate. Thus, an electro-optical device of the invention was fabricated.

The above described electro-optical cell was found to have uniform alignment and excellent characteristics of a contrast of 1 : 80 and a visibility angle of more than 80°. Furthermore, even when this cell was heated to 80°C and then cooled to room temperature, it still retained its uniformity of alignment without any change.

EXAMPLE 7.

Glass plates for electrodes on which indium oxide had been deposited by evaporation were washed and then immersed in and coated with a 0.1-percent dimethyl sulfoxide solution of poly-L-leucine and were thereafter heated and dried. Each of a pair of these glass plates was orientated by rubbing it with a cloth in one direction. Thereafter, the two plates were positioned so that their surfaces coated with the poly-α-amino acid film were on their inner sides and facing each other. The two plates were then bonded and fixed in the same manner as in Example 3 with their orientated directions at an angle of 45° with each other.

Thereafter, a mixed nematic liquid crystal substance composed of 40 parts of p-methoxybenzylidene-p'-n-butylaniline, 60 parts of p-ethoxybenzylidene-p'-n-butylaniline, 20 parts of n-butoxyphenyl-p'-cyanobenzoate, 10 parts of p-n-amyloxyphenyl-p'-cyanobenzoate, and 5 parts of n-propylbenzylidene-p'-cyanoaniline was introduced into the space between the two plates through a previously provided pouring port, which was then sealed with an epoxy resin. Thus, an electro-optical cell was obtained.

Next, two polarizers were so installed on the outer sides of the above described electro-optical cell that their polarization directions are respectively parallel to the orientated directions of their respectively adjacent electrode base plates. Thus, an electro-optical device of transmission type was obtained. In addition a reflecting plate of aluminum film which had been matted by sandblasting was positioned on the outer side of the back polarizer of the above-mentioned electro-optical device, whereupon another electro-optical device of reflecting type was obtained.

The above described electro-optical cell was found to have a uniform alignment and exhibited a contrast of 1 : 30 and a visibility angle of 50° at 6 V (30 Hz, sine wave) in the case of the transmission type and a contrast of 1 : 30 and a visibility angle of 55° in the case of the reflecting type.

We claim:

1. An electro-optical cell comprises, on an optical path: front and back electrode base plates each comprising a transparent base plate having an inner surface, an electrode film provided on said inner surface, and an optically active poly-α-amino acid film provided on said inner surface over the electrode film and orientated in one direction intersecting the orientated direction of the poly-α-amino acid film of the other electrode base plate as viewed along the optical path, the electrode base plates being disposed with the inner surfaces of their base plates in mutually facing state; and a nematic liquid crystal substance having a positive dielectric anisotropy and interposed between the front and back electrode base plates.

2. An electro-optical cell as claimed in claim 1 in which the electrode film is a film of an oxide selected from the group consisting of tin oxide and indium oxide.

3. An electro-optical cell as claimed in claim 1 in which each transparent base plate is a glass plate.

4. An electro-optical cell as claimed in claim 1 in which the orientated directions of the poly-α-amino acid films intersect at right angles as viewed along the optical path.

5. An electro-optical cell as claimed in claim 1 in which each poly-α-amino acid film is orientated by rubbing the film with a cloth or a brush.

6. An electro-optical cell as claimed in claim 1 in which the poly-α-amino acid is represented by the general formula

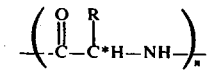

where: $n$ is from 10 to $10^4$; R is a member selected from the group consisting of —CH$_3$ (alanine),

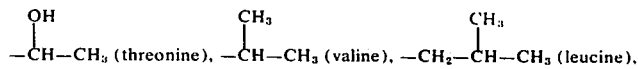

—CH$_2$OH(serine), — CH$_2$ — CH$_2$.S.CH$_3$ (methionine),

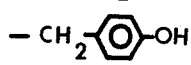

(tyrosine),

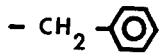

(phenylalanine),

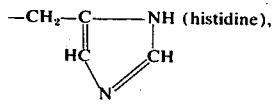

— CH$_2$ — COOH (aspartic acid), — CH$_2$CH$_2$COOH (glutamic acid),

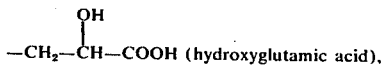

— CH$_2$CH$_2$COOR' (glutamates) (where R' is alkyl, alkylphenyl, phenyl, or naphthyl), — CH$_2$CH$_2$CH$_2$CH$_2$NH$_2$(lysine), and

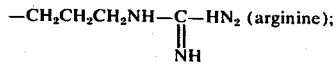

and C* is an asymmetric carbon atom.

7. An electro-oltical device comprising, on an optical path:
1. an electro-optical cell comprises: front and back electrode base plates each comprising a transparent base plate having an inner surface, an electrode film provided on said inner surface, and an optically active poly-α-amino acid film provided on said inner surface over the electrode film and orientated in one direction intersecting the orientated direction of the poly-α-amino acid film of the other electrode base plate as viewed along the optical path, the electrode base plates being disposed with the inner surfaces of their base plates in mutually facing state; and a nematic liquid crystal substance having a positive dielectric anisotropy and interposed between the front and back electrode base plates, and
2. a pair of front and back polarizers respectively disposed on the outer sides of the front and back base plates.

8. An electro-optical device as claimed in claim 7 in which a reflecting plate is disposed on the outer side of the back polarizer.

9. An electro-optical device as claimed in claim 8 in which the front and back polarizers have respective polarization directions which are respectively parallel to the orientated directions of the poly-α-amino acid films of the front and back electrode base plates as viewed along the optical path.

10. An electro-optical device as claimed in claim 8 in which the back polarizer has a polarization direction parallel to the orientated direction of the poly-α-amino acid film of the back electrode base plate, and the front polarizer has a polarization direction which is at an angle of from 5° to 40° relative to the orientated direction of the poly-α-amino acid film of the front electrode base plate as viewed along the optical path.

11. An electro-optical device as claimed in claim 10 in which the polarization direction of the front polarizer is inclined in the same direction as the helical rotation direction of the liquid crystal induced by the poly-α-amino acid films of the electrode base plates as viewed along the optical path.

12. An electro-optical device as claimed in claim 7 in which the front and back polarizers have respective polarization directions which are respectively parallel to the orientated directions of the poly-α-amino acid films of the front and back electrode base plates as viewed along the optical path.

13. An electro-optical device as claimed in claim 7 in which the front and back polarizers have respective polarization directions which are respectively at angles of from 5° to 40° relative to the orientated directions of the poly-α-amino acid films of the front and back electrode base plates as viewed along the optical path.

14. An electro-optical device as claimed in claim 13 in which the polarization directions of the front and back polarizers are inclined respectively in the same direction as and in the opposite direction to the helical rotation direction of the liquid crystal induced by the poly-α-amino acid films of the electrode base plates as viewed along the optical path.

* * * * *

UNITED STATES PATENT AND TRADEMARK OFFICE
CERTIFICATE OF CORRECTION

PATENT NO. : 3,977,767
DATED : August 31, 1976
INVENTOR(S) : Yoshihisa Okuma, Takashi Toida and Ichiro Tsunoda It is certified that error appears in the above-identified patent and that said Letters Patent are hereby corrected as shown below:

On the Title Page

[73] Assignee: Dai Nippon Insatsu Kabushiki Kaisha, Tokyo, Japan should read instead

[73] Assignee: Dai Nippon Insatsu Kabushiki Kaisha, Tokyo, Japan and

Ichiro Tsunoda, Kanagawa-Ken, Japan --.

Signed and Sealed this

Twenty-ninth Day of March 1977

[SEAL]

Attest:

RUTH C. MASON
*Attesting Officer*

C. MARSHALL DANN
*Commissioner of Patents and Trademarks*